United States Patent

Masumi et al.

Patent Number: 5,422,922
Date of Patent: Jun. 6, 1995

[54] FUEL ASSEMBLY AND REACTOR CORE

[75] Inventors: Ryoji Masumi, Hitachi; Motoo Aoyama, Mito; Junichi Koyama, Hitachi; Yoko Ishibashi, Hitachioota; Takaaki Mochida; Hideo Soneda, both of Hitachi, all of Japan

[73] Assignee: Hitachi, Ltd., Tokyo, Japan

[21] Appl. No.: 158,426

[22] Filed: Nov. 29, 1993

[30] Foreign Application Priority Data

Dec. 3, 1992 [JP] Japan .................... 4-324392

[51] Int. Cl.⁶ .................................. G21C 3/32
[52] U.S. Cl. ........................ 376/447; 376/458; 376/419; 376/444
[58] Field of Search ........... 376/419, 428, 444, 447, 376/458; 976/DIG. 64

[56] References Cited

U.S. PATENT DOCUMENTS

| 4,655,986 | 4/1987 | Kawashima et al. | 376/173 |
| 4,701,296 | 10/1987 | Millot et al. | 376/172 |
| 4,789,520 | 12/1988 | Morimoto et al. | 376/419 |
| 5,023,047 | 6/1991 | Nishida et al. | 376/370 |
| 5,149,495 | 9/1992 | Elkins | 376/446 |
| 5,202,085 | 4/1993 | Aoyama et al. | 376/435 |

Primary Examiner—Donald P. Walsh
Assistant Examiner—Meena Chelliah
Attorney, Agent, or Firm—Antonelli, Terry, Stout & Kraus

[57] ABSTRACT

A fuel assembly and a reactor core using same which are able to increase size of the fuel assembly with ensuring thermal margin and reactor shut down margin.

A distance between centers of adjacent fuel assemblies is about 23 cm, which is enlarged about 1.5 times of conventional fuel assemblies. A thickness of water gap region is about 16 cm, which is relatively thinner than that of prior art. While, H/U ratio is about 5 as same as that of the prior art, and decreasing amount of non-boiling water in the water gap region is arranged in a channel box as water rods. Consequently, a ratio of transversal cross section area of the water rods to transversal cross section area of the fuel rods becomes about 0.6, and local power peaking factor can be decreased and thermal margin can be increased. Further, the transversal cross section area of the water rod is selected to be 15 cm² so as to ensure the reactor shut down margin by reducing excess reactivity.

9 Claims, 16 Drawing Sheets

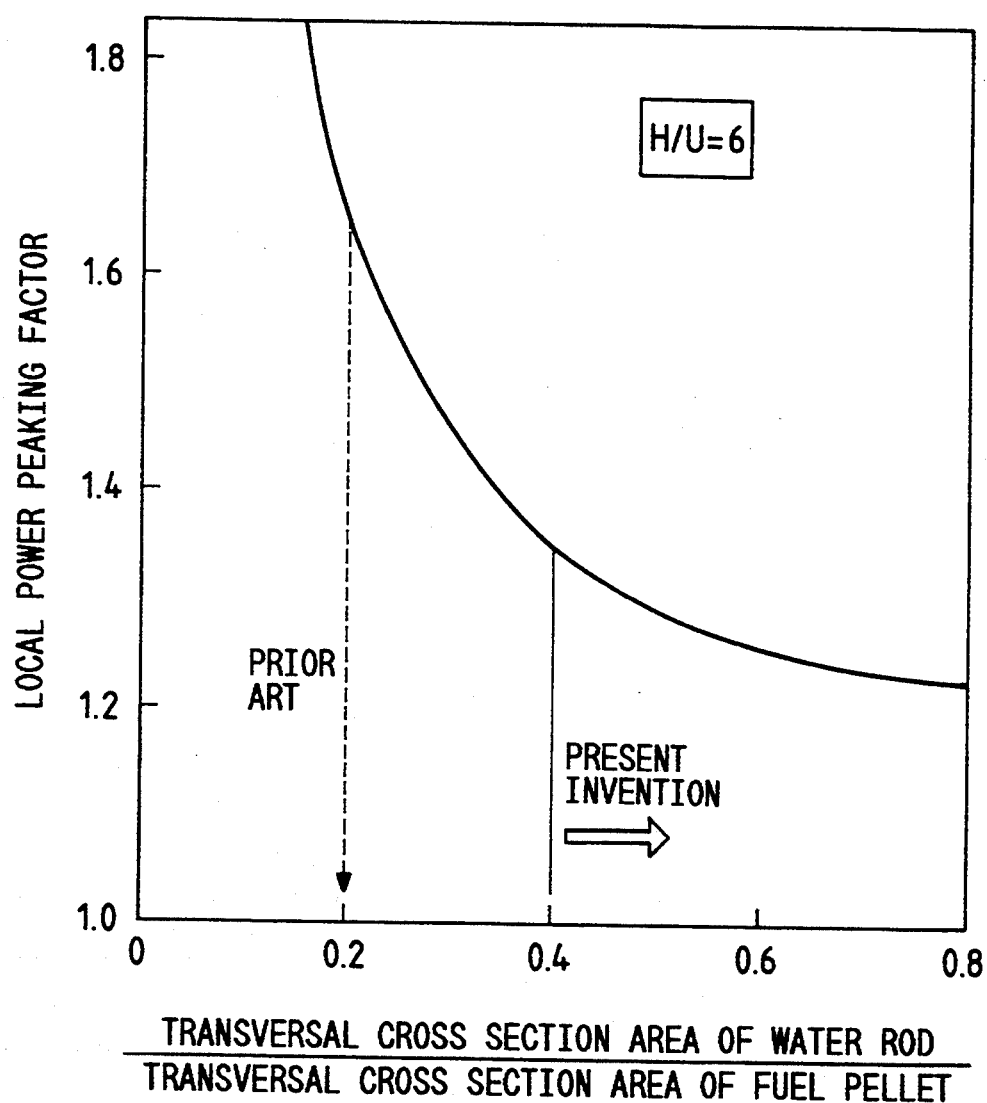

FUEL ASSEMBLY AND REACTOR CORE

BACKGROUND OF THE INVENTION

(1) Field of the Invention

The present invention relates to boiling water reactors (BWR), particularly, to preferable fuel assemblies and reactor cores for labor-saving fuel shuffling operation by increasing size of the fuel assembly and reducing number of the fuel assemblies with ensuring thermal margin and reactor shut down margin.

(2) Description of the Prior Art

A fuel assembly for BWR is, in general, composed of a bundle of fuel rods forming a square lattice, each of the fuel rods is manufactured by inserting a plurality of fuel pellets containing fissile material into a cladding tube and sealing, and a channel box having a hollow square cross section, an outer side of which is about 14 cm, which covers the above fuel bundle. A reactor core is formed in a cylindrical shape by further bundling of the above fuel assemblies. As for fuel, enriched uranium or/and plutonium-enriched uranium is used in a chemical form of oxide.

As reactivity of reactor core decreases with burning of fuel, the fuel is loaded into the reactor core more than the critical amount at beginning of the reactor operation cycle so that the reactor maintains criticality. Excess reactivity yielded by loading of the excess fuel is controlled by adjusting neutron absorption in the reactor core with mixing burnable poison such as gadolinia etc. into the fuel, and inserting control rods having cruciform cross section, which comprise boron carbide or hafnium, among a plurality of adjacent fuel assemblies.

In order to allow inserting the cruciform control rod into the reactor core, water gap regions being filled with non-boiling water, of which gap size is almost twice of a blade thickness of the control rod, are provided around the channel box of the fuel assemblies. Moreover, water rods filled with non-boiling water are provided at center of the fuel assembly in view of neutron flux flattening. Atomic numbers ratio of hydrogen to uranium in the reactor core average (optionally it is called H/U ratio hereinafter) which depends on a size of the above non-boiling water region and the amount of fissile material is adjusted in a range of 4–5 in order to make necessary enrichment of the fuel lowest mainly in view of uranium resource saving.

On the other hand, the excess reactivity increases at shut down of the reactor because of increase in water by phase change of steam to water. Accordingly, it becomes important to ensure reactor shut down margin. Regarding to methods for increasing reactor shut down margin of the fuel assembly and the reactor core, the following two methods are well known as prior art;

(1) JP-A-63-231293 (1988)

In accordance with this prior art, neutron average energy in the reactor core is reduced, a difference in neutron moderating effect between upper portion and lower portion of the reactor core is reduced, and consequently, the reactor shut down margin is increased, by making a ratio of transverse cross section area of the water gap region which is a saturated water region outside the channel box to transverse cross section area of pellets in all fuel rods in the channel box at least one.

(2) JP-A-2-12088 (1990)

In accordance with this prior art, an excess reactivity of the reactor core is reduced and, consequently, the reactor shut down margin is increased, by composing the fuel assembly so as to have a non-boiling water region of which area is at least 9.1% of the transverse cross section area of the channel box.

Hitherto, increase of output power has been achieved in general by increasing in the number of fuel assemblies. However, the increase in the number of fuel assemblies in the reactor core causes increase in the numbers of fuel assemblies to be shuffled and to be transferred in periodical inspection of the reactor core, and consequently, necessary period and man-hour for fuel exchange operations increase and an utilization factor for the plant can be lowered. Therefore, there is a problem that a scale merit which is expected by the increase of the output power is not necessarily obtained. Accordingly, in view of labor saving for fuel exchange operation, it is effective to increase size of a fuel assembly for reducing total number of fuel assemblies in the reactor core.

On the other hand, the increase in size of a fuel assembly causes increment of local power peaking factor in a diametral direction because of increase in heterogeneity of the reactor core. Further, the number of the fuel assemblies in the reactor core decreases by increasing size of the fuel assembly under a condition that the reactor core has a constant size. Accordingly, the number of control rods being inserted among the fuel assemblies also decreases. It means relative decrease in total length of the control rod blade, reducing in control rods worth, and decrease in the reactor shut down margin. Therefore, it is necessary to have means for preventing above described problems when increasing size of the fuel assembly.

When the above described prior art are applied for increasing size of the fuel assembly, the following defects exist;

In accordance with the prior art, JP-A-63-231293 (1988), the reactor shut down margin can be increased by reducing the neutron moderating effect, but thermal margin is decreased by increase in the ratio of the transverse cross section area of the water gap region to the transverse cross section area of the total fuel pellets.

In accordance with the prior art, JP-A-2-12088 (1990), the transverse cross section of the non-boiling water region is defined by taking the internal transverse cross section of the channel box as a base. Therefore, there are some cases in which effective increment of the reactor shut down margin can not be achieved depending on a loading condition of the fuel rods in the fuel assembly. As for the thermal margin, the situation is the same. Further, the above defined value for the transverse cross section of the non-boiling water region varies depending on the kind of the fuel material such as uranium-plutonium mixed oxides, or enriched uranium.

SUMMARY OF THE INVENTION

(1) Objects of the Invention

The first object of the present invention is to provide a fuel assembly and a reactor core therefor which are capable of increasing size of the fuel assembly.

The second object of the present invention is to provide a fuel assembly and a reactor core therefor which are capable of increasing size of the fuel assembly with ensuring thermal margin.

The third object of the present invention is to provide a fuel assembly and a reactor core therefor which are capable of increasing size of the fuel assembly with ensuring reactor shut down margin.

In the present invention, increasing size of the fuel assembly is aimed at about 1.5 times of the conventional fuel assembly in consideration of reducing the number of the fuel assemblies about a half of the conventional one.

(2) Methods for solving the Problems

In order to achieve the above first and the second objectives of the present invention, a fuel assembly having a plurality of fuel rods which are composed by inserting a plurality of fuel pellets containing fissile material into cladding tubes and sealing the cladding tubes, and at least a moderating rod filled with a moderator for moderating neutrons which are generated by nuclear fissions of the fissile material, characterized in having an average ratio at least 0.4 in the axial direction of a sum of transverse cross section area of the portion filled with the moderator of the moderating rods to a sum of transverse cross section area of the fuel pellets is provided.

In order to achieve the above first and the third objectives of the present invention, the above fuel assembly preferably having the transverse cross section area for the portion filled with the moderator of 14–50 cm$^2$ per moderating rod is provided.

Further, preferably, the above fuel assembly characterized in having a value in a range of 2.7–3.4 for a ratio of a sum of transverse cross section area of the moderator at a horizontal cross section surrounded by hypothetical planes which are imaginarily formed by extending outer hem of upper tie plate, which bundles upper ends of a plurality of the above fuel rods, downward vertically to the horizontal cross section to a sum of transverse cross section area of the fuel pellets is provided.

Further preferably, in order to achieve the first objective of the present invention, the above fuel assembly characterized in having at least a double wall tube in which water level goes up and down depending on flow rate of the moderator as for one of the moderating rods is provided.

Further, in order to achieve the above first to third objectives of the present invention, a reactor core having the above fuel assembly according to the present invention is provided.

Further preferably, in order to achieve the first and the second objectives of the present invention, the above reactor core characterized in having a ratio utmost 0.7 of a sum of transverse cross section area for the moderator being filled in the water gap region around the fuel assembly to a sum of transverse cross section area for the above fuel pellets is provided.

In order to achieve the first and the third objectives of the present invention, the above reactor core preferably having a control rod which is composed of a plurality of absorbing rods containing neutron absorber bundled in a shape having a cruciform cross section, and being inserted into the water gap region around the fuel assemblies, and a ratio at least 0.20 for a sum of surface area of the above absorbing rods to a sum of surface area of the above fuel rods is provided.

Further preferably, the above reactor core having a control rod which is composed of a plurality of absorbing rods containing neutron absorber bundled in a shape having a cruciform cross section, and being inserted into the water gap region around the fuel assemblies, and a ratio at least 0.4 for a sum of transverse cross section area of the above absorbing rods to a sum of transverse cross section area of the above water gap region is provided.

Further preferably, the above reactor core having a value between 3.0–3.5 for a ratio of a sum of transverse cross section area of the above moderator to a sum of transverse cross section area of the above fuel pellets is provided.

In accordance with the present invention which is composed as above described, a transverse cross section area of the moderator in the moderating rod is increased, a transverse cross section area of the water gap region is decreased, values of local power peaking factor is decreased, and thermal margin is ensured, by making a ratio of transverse cross section area of the portion filled with moderator in the moderating rod to transverse cross section area of the fuel pellets averaged in the axial direction at least 0.4.

Moreover, the excess reactivity is reduced and the reactor shut down margin is ensured, by making the transverse cross section area of the moderator per moderating rod 14–50 cm$^2$. Further, the excess reactivity is reduced and the reactor shut down margin is ensured, by making a ratio of a sum of transverse cross section area of the moderator at a horizontal cross section surrounded by hypothetical planes which are imaginarily formed by extending outer hem of upper tie plate downward vertically to the horizontal cross section to a sum of transverse cross section area of the fuel pellets a value in a range of 2.7–3.4. By using a double wall tube water rod as for at least one of the moderating rods, effects of spectrum shift are multiplied to reduce necessary uranium enrichment, and an operation without inserting control rods can be performed.

The local power peaking factor is reduced and the thermal margin can be ensured by making a ratio of a sum of transverse cross section area of the moderator being filled in the water gap region around the fuel assemblies to a sum of transverse cross section area of the fuel pellets utmost 0.7. The control rod worth is increased and the reactor shut down margin is ensured by making a ratio of a sum of surface area of the absorbing rods to a sum of surface area of the fuel rods at least 0.20. Further, the control rod worth is increased and the reactor shut down margin is ensured by making a ratio of a sum of transverse cross section area of the absorbing rods to a sum of transverse cross section area of the water gap region at least 0.4. The excess reactivity is decreased and the reactor shut down margin is ensured by making a ratio of a sum of transverse cross section area of the moderator to a sum of transverse cross section area of the fuel pellets a value in a range 3.0–3.5.

BRIEF DESCRIPTION OF THE DRAWINGS

FIG. 9 is a graph showing a relationship in change of a local power peaking factor corresponding to change of a ratio of a transversal cross section area inside water rods to transversal cross section area of fuel pellets.

DETAILED DESCRIPTION OF THE EMBODIMENTS

Referring to FIGS. 1-15, embodiments of the present invention are explained hereinafter.

Embodiment 1

Referring to FIGS. 1-7, the first embodiment of the present invention is explained.

Figure 1:
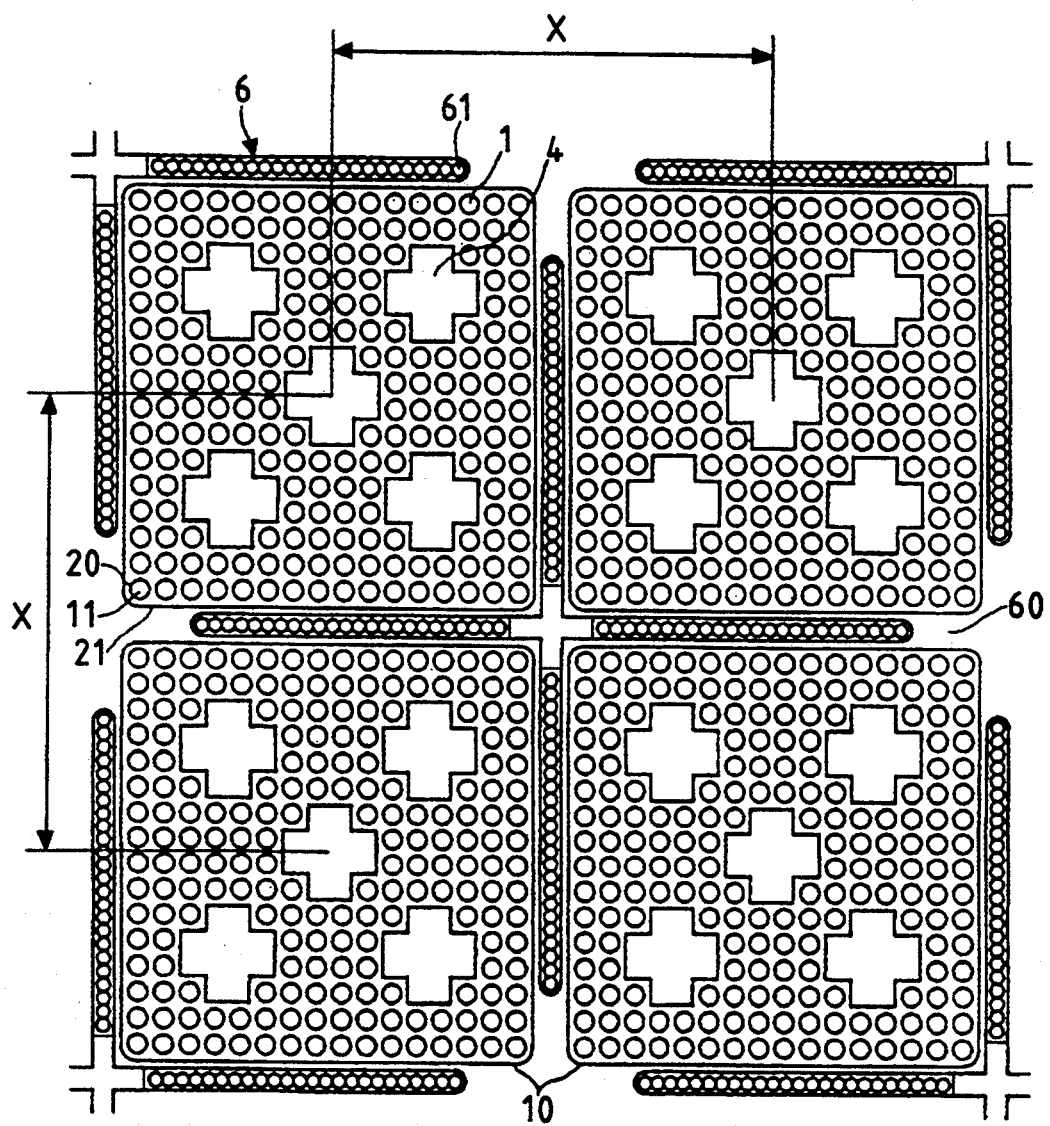
FIG. 1 is a horizontal cross section of four fuel assemblies relating to the first embodiment of the present invention.

Referring to FIG. 1, a fuel assembly 10 is composed of a plurality of fuel rods 1 which are fabricated by inserting fuel pellets 11 comprising enriched uranium oxide into a zircaloy cladding tube 20, a plurality of water rods 4 having cruciform cross section which are filled with non-boiling water as moderator, and a rectangular zircaloy channel box 21 covering a bundle of the fuel rods 1 and the water rods 4. A distance X between respective centers of two adjacent fuel assemblies 10 is about 23 cm, which is increased to almost 1.5 times comparing with that of conventional fuel assemblies, 15 cm. A cruciform control rod 6 comprising a bundle of absorbers 61 which contain boron carbide can be inserted into a water gap region 60 among four fuel assemblies 10 in order to control an excess reactivity. Regarding to a fuel assembly, taking two sides a set out of four sides of the fuel assembly which equal to four sides of its rectangular cross section, a control rod 6 per set of sides can be inserted into the water gap region so as to interface to the sides composing the set. In other words, the control rod 6 can be inserted interfacing to all sides of the rectangular cross section of the fuel assembly 10.

Figure 2:
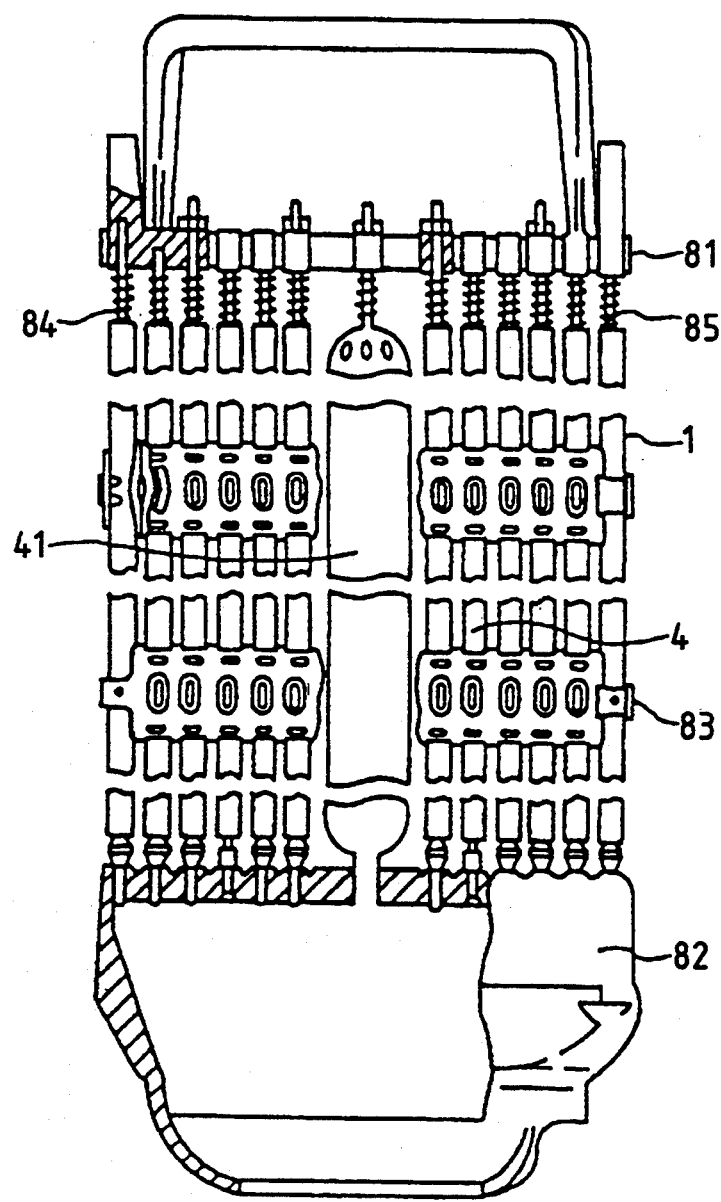
FIG. 2 is a partial vertical cross section of the fuel assembly without a channel box.

Referring to FIG. 2, the fuel rod 1 and the water rod 4 are held by an upper tie plate 81 at the upper end and by a lower tie plate 82 at the lower end, and a plurality of intermediate portions are supported by spacers 83. The channel box 21 shown in FIG. 1 surrounds a fuel bundle comprising the fuel rods 1 and the water rods 4.

The fuel rod 1 contains fuel pellets 11 of which enrichment is about 6% and diameter is about 8 mm. Diameter of the fuel rod 1 is about 10 mm, and 196 fuel rods are arranged in a lattice of 16 rows and 16 columns with an interval of about 13 mm between each fuel rod.

The water rod 4 has a cross section area of about 15 $cm^2$, and five water rods are arranged in a fuel assembly 10. Hydrogen/uranium ratio (hereinafter called H/U ratio) is about 5 as well as conventional one.

The control rod 6 is composed of absorbers 61 having a diameter of about 6 mm such as 24 absorbers per blade are arranged as shown in FIG. 1. Thickness of the blade is the same as conventional one, about 8 mm.

The water gap region 60 is filled with non-boiling water. Thickness of the water gap region 60 is the same as conventional one, about twice of the thickness of the control rod blade, about 16 mm. Accordingly, the water gap region 60 becomes relatively thinner to the increased amount of the fuel assembly. That means, the non-boiling water in the water gap region 60 becomes less than conventional one. While, the H/U ratio is the same as conventional one, about 5. Therefore, non-boiling water as much as the decreased amount of non-boiling water in the water gap region 60 exists in the channel box 21 in a form of increased amount of non-boiling water in the water rod 4.

In the fuel assembly 10 of the present embodiment, an axial average ratio of a sum of transversal cross section areas of portions wherein non-boiling water in the water rod 4 is filled to a sum of transversal cross section area of the fuel pellets 11 (hereinafter called transversal cross section area of water rod/transversal cross section area of fuel pellet) is nearly equal to 0.6, and transversal cross section area of the region wherein non-boiling water is filled per water rod 4 (hereinafter called transversal cross section area per water rod) is about 15 $cm^2$.

Further, from a viewpoint of per reactor core, a ratio of a sum of transversal cross section areas filled with non-boiling water in the water gap region 60 around the fuel assemblies 10 to a sum of transversal cross section areas of fuel pellets 11 (hereinafter called transversal cross section area of water gap region/transversal cross section area of fuel pellet) is about 0.5, a ratio of a sum of surface areas of the absorbers 61 to a sum of surface areas of the fuel rods 1 (hereinafter called surface area of absorber/surface area of fuel rod) is about 0.2, and a ratio of a sum of transversal cross section areas of the absorbers 61 to a sum of transversal cross section areas of the water gap regions 60 (hereinafter called transversal cross section area of absorber/transversal cross section area of water gap region) is about 0.4.

The fuel assembly 10 of the present embodiment is aimed at increasing size of the fuel assembly 10 with ensuring thermal margin by increasing transversal cross section area of the water rod 4 and reactor shut down margin by optimizing the transversal cross section area of the water rod 4 so as to reduce excess reactivity.

Hereinafter, methods for achieving the above objective of the present embodiment is explained concretely using FIGS. 3-5.

In order to increase thermal margin, it is necessary to reduce a local power peaking factor of the fuel assembly. The inventors of the present application investigated on a relationship between the local power peaking coefficient in a diametral direction and transversal cross section area of water rod/transversal cross section area of fuel pellet, and obtained a result shown in FIG. 3.

Figure 3:
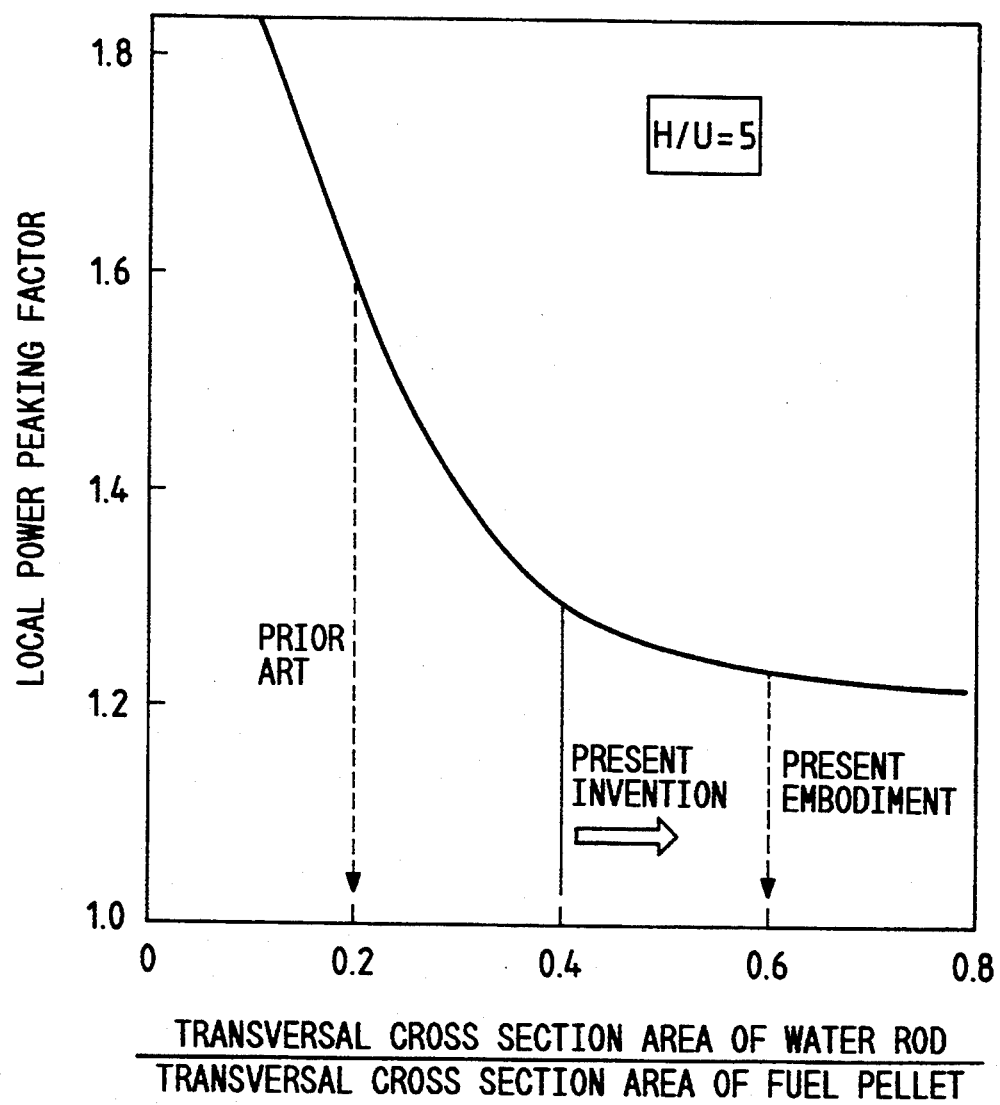
FIG. 3 is a graph showing a relationship in change of a local power peaking factor corresponding to change of a ratio of a transversal cross section area inside water rods to transversal cross section area of fuel pellets.

The result shown in FIG. 3 was obtained in a manner that variation of local power peaking factors in a diametral direction depending on variation of a ratio of transversal cross section area of water rod/transversal cross section area of fuel pellet was calculated on a reactor core wherein fuel assemblies were arranged in the reactor core, sizes of the fuel assembly was increased with keeping thicknesses of water gaps constant, and the H/U ratio was fixed at about 5 by increasing cross section area of water rods as much as the amount the water gap area to be increased. In accordance with FIG. 3, it is revealed that the local power peaking factor decreases when the water rod transversal cross section area increases from the point by the prior art, a ratio of transversal cross section area of water rod/transversal cross section area of fuel pellet is substantially 0.2, because of decreasing water in the vicinity of fuel rods at the outer region in the fuel assembly with decreasing water in the water gap. However, the above described decrease of the local power peaking factor is saturated after increasing the water rod transversal cross section area to a certain extent because output of fuel rods located at the inner region in the fuel assembly increases with increasing water surrounding the fuel rods, and the local power peaking factor scarcely decrease any more even if the water rod transversal cross section area increases further.

Referring to FIG. 3, a decreasing rate of the local power peaking factor has an inflection point at about 0.4 of the ratio of transversal cross section area of water rod/transversal cross section area of fuel pellet, and the decreasing rate of the local power peaking factor closes to saturation as the water rod transversal cross section area increases. Therefore, it was revealed that, in order to keep the local power peaking factor low when the size of the fuel assembly increases, it is effective to select the ratio of transversal cross section area of water rod/transversal cross section area of fuel pellet at least 0.4.

The fuel assembly 10 of the present embodiment has a value of about 0.6 for the ratio of transversal cross section area of water rod/transversal cross section area of fuel pellet by increasing the transversal cross section area of the water rod 4 and decreasing the transversal cross section area of the water gap region 60. Accordingly, it is possible to decrease the local power peaking factor, and to increase the thermal margin.

On the other hand, in order to increase the reactor shut down margin, it is effective to decrease the excess reactivity. The inventors of the present application obtained a relationship shown in FIG. 4 by investigating a relationship between the transversal cross section area per water rod in the fuel assembly, and an infinite multiplication factor and an excess reactivity (difference of reactivity in cold condition-difference of reactivity in hot condition) which express a reactivity of the fuel assembly.

Referring to FIG. 4, results were obtained on variation of the infinite multiplication factor in cold condition and in hot condition (FIG. 4 (a)) and variation of reactivity difference between the hot condition and the cold condition (FIG. 4 (b)) depending on variation of transversal cross section area per water rod caused by changing the number of water rods without changing a sum of total transversal cross section area of the water rods in a reactor core having a constant H/U ratio in a range of 5-6.

In the result shown in 4 (a), when the transversal cross section area per water rod increases from the value of about 12 cm$^2$ of the prior art, the reactivities both in cold condition and the hot condition decrease. However, as a decreasing width in cold condition is larger than that in hot condition, the reactivity difference between the hot condition and the cold condition decreases gradually as shown in FIG. 4 (b). And the infinite multiplication factor in the cold condition becomes less than that in the hot condition at the transversal cross section area of the water rod reaches at about 50 cm$^2$, and the reactivity difference becomes a negative value.

The relationships shown in FIGS. 4 (a) and 4 (b) are correct notwithstanding kinds and sizes of the fuel assemblies if the constant value of the H/U lies in a range 5-6.

According to FIGS. 4 (a) and 4 (b), it is revealed that, if the transversal cross section area per water rod is selected to be at least 14 cm$^2$, the reactivity difference between the hot condition and the cold condition becomes less than that of the prior art, and it is effective for increasing the reactor shut down margin. Further, it is also revealed that, when the transversal cross section area per water rod is about 50 cm$^2$, the infinite multiplication factor in the cold condition becomes less than that in the hot condition. Consequently, it was concluded that, in order to increase the reactor shut down margin with increasing size of the fuel assembly, it is effective to select the transversal cross section area per water rod to be in a range 14-50 cm$^2$.

The fuel assembly 10 in the present embodiment contains the water rod 4 having the transversal cross section area of 15 cm$^2$, satisfies the above condition, and is able to reduce the excess reactivity and increases the reactor shut down margin.

Figure 5:
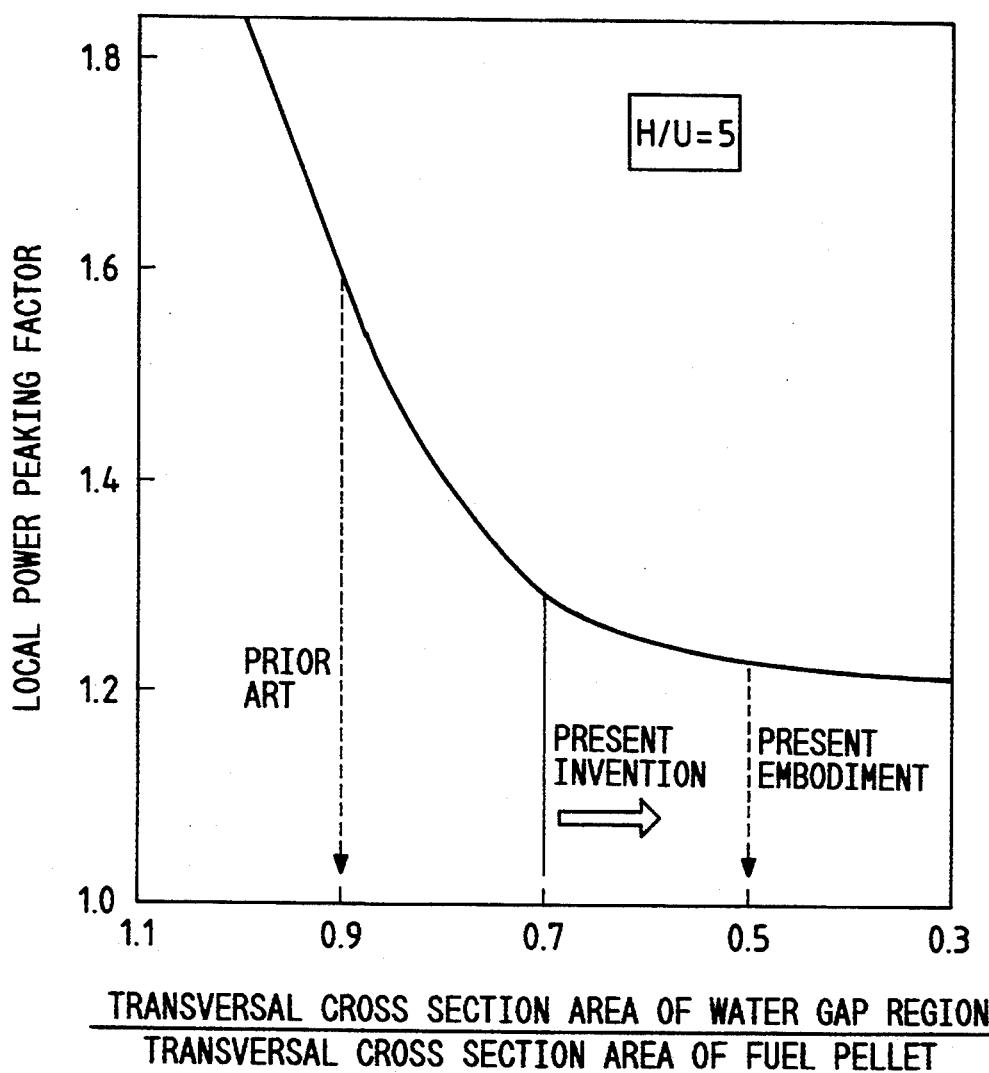
FIG. 5 is a graph showing a relationship in change of a local power peaking factor corresponding to change of a ratio of a transversal cross section area of water gap regions to transversal cross section area of fuel pellets.

Next, the inventors investigated a relationship between local power peaking factor in a diametral direction of the core and a ratio of transversal cross section area of water gap region/transversal cross section area of fuel pellet in view of reducing the local power peaking factor in the core for increasing thermal margin of the reactor core using the fuel assemblies of the present embodiment, and obtained a result shown in FIG. 5. The result was obtained by converting the result shown in FIG. 3, that is the relationship between the ratio of transversal cross section area of water rod/transversal cross section area of fuel pellet and the local power peaking factor in a diametral direction, to the relationship between the ratio of transversal cross section area of water gap region/transversal cross section area of fuel pellet and the local power peaking factor in a diametral direction in consideration that the H/U ratio was constant, about 5. The qualitative trend indicated in FIG. 5 is very similar with that observed in FIG. 3 except the abscissa indicates the ratio of transversal cross section area of water gap region/transversal cross section area of fuel pellet in the reactor core instead of the ratio of transversal cross section area of water rod/transversal cross section area of fuel pellet and consequent change of absolute value in the abscissa. That means, the decreasing rate of the local power peaking factor closes to saturation in a region having at least 0.7 of the ratio of transversal cross section area of water gap region/transversal cross section area of fuel pellet. Consequently, it was concluded that, in order to decrease the local power peaking factor with increasing size of the fuel assembly, it is effective to select at least 0.7 for a value of the ratio of transversal cross section area of water gap region/transversal cross section area of fuel pellet.

The reactor core using the fuel assemblies 10 of the present embodiment has a value of 0.5 for the ratio of transversal cross section area of water gap region/transversal cross section area of fuel pellet by increasing the transversal cross section area of the water rods 4 and decreasing the transversal cross section area of the water gap region. Consequently, the reactor core of the present embodiment can reduce the local power peaking factor and increase the thermal margin.

Besides, the reactor core using the fuel assemblies 10 of the present embodiment can increase the reactor shut down margin by increasing control rod worth in addition to the increasing effect for the reactor shut down margin by composition of the fuel assemblies 10. This effect is explained hereinafter referring to FIGS. 6 and 7.

The inventors investigated a relationship between a surface area of fuel rods used in the reactor core, a surface area of absorbing rods, and an area of the water gap region 60. Results of the investigation are shown in FIGS. 6 and 7.

Figure 6:
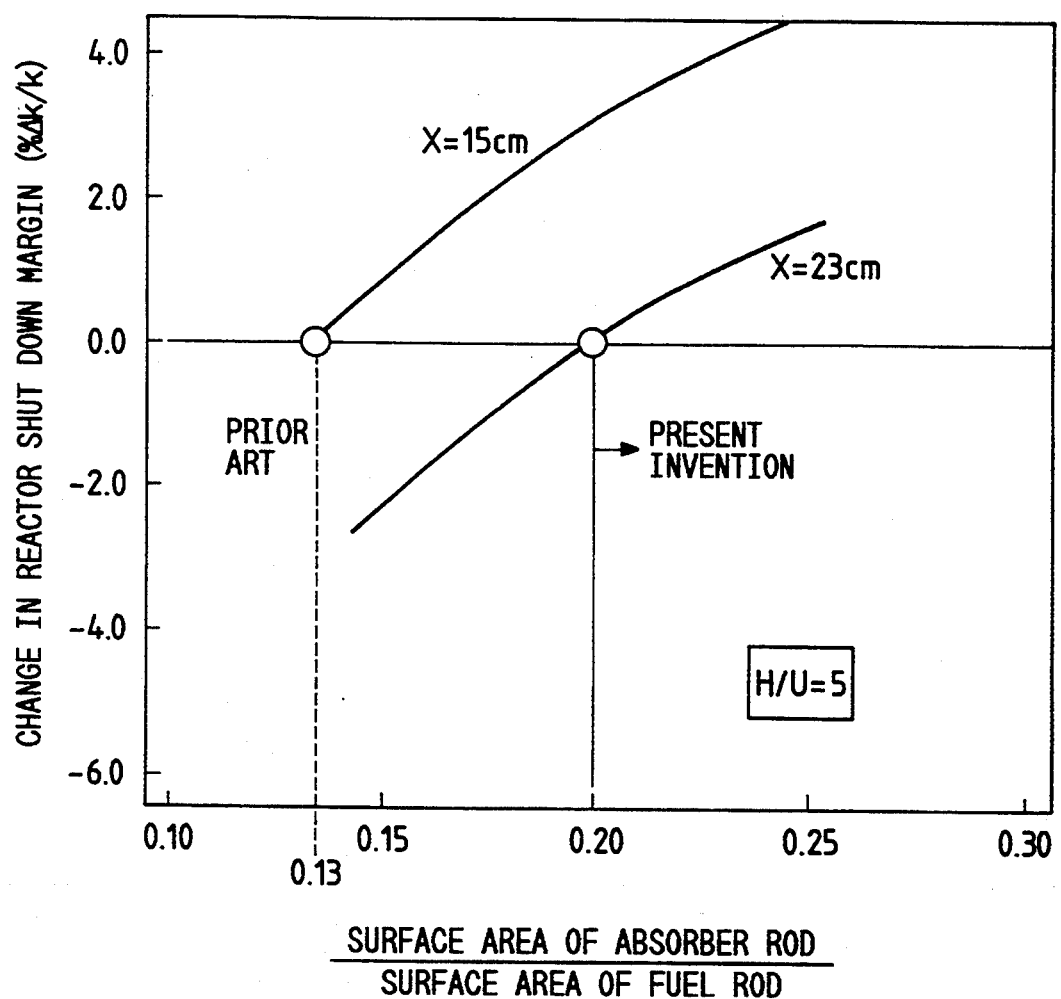
FIG. 6 is a graph showing a relationship in change of reactor shut down margin corresponding to a surface area ratio of absorbing rods and fuel rods.
Figure 7:
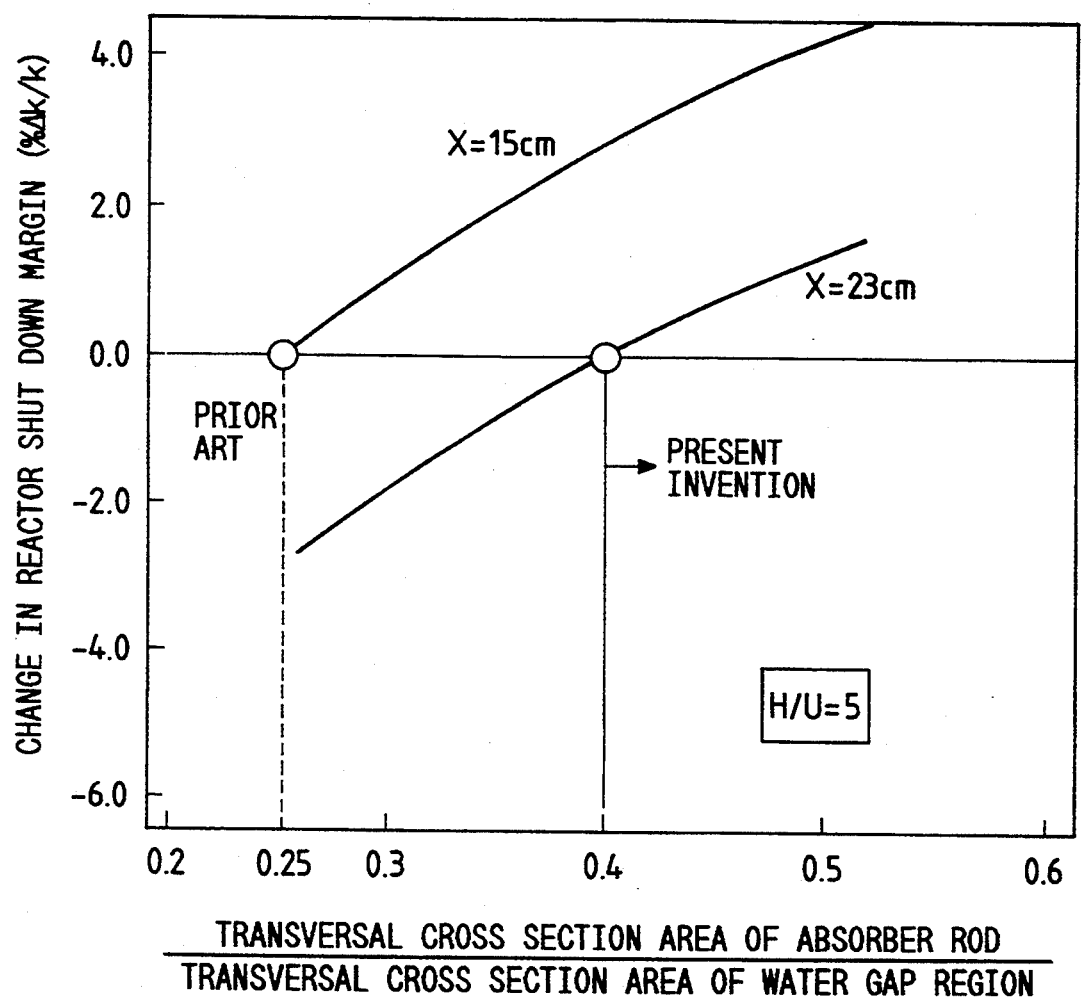
FIG. 7 is a graph showing a relationship in change of reactor shut down margin corresponding to a ratio of a transversal cross section area of absorbing rods and a transversal cross section area of water gap regions.

Referring to FIG. 6, change in reactor shut down margin depending on variation of the ratio of surface area of absorbing rod/surface area of fuel rod was calculated using the reactor shut down margin obtained by the prior art as a standard under a condition that the H/U ratio was fixed at 5 on two cases, the one was on the case in which the distance (X) between the adjacent fuel assemblies was 15 cm (the same as the prior art), and the other was on the case in which the distance between the adjacent fuel assemblies was 23 cm (increasing size). The result shown in FIG. 6 indicates a characteristics which can be expressed by a right up line, that means the control rod worth increases in accordance with increasing the surface area of the absorbing rods relatively, and consequently the reactor shut down margin increases in both the above two cases, the X is 15 cm or 23 cm. However, the characteristic curve on the case where the X is 23 cm by increasing the size of the fuel assembly moves downwards in comparison with the case where the X is 15 cm because the number of the control rods per the reactor core decreases and it causes decreasing the control rod worth.

In accordance with the result shown in FIG. 6, it was revealed that an equivalent reactor shut down margin to that of the prior art (using the fuel assemblies having an X nearly equals to 15 cm, and the ratio of surface area of absorbing rod/surface area of fuel rod nearly equals to 0.13) could be ensured with the fuel assemblies of increased size having an X equals to 23 cm by selecting the ratio of surface area of absorbing rod/surface area of fuel rod at least 0.20.

In the reactor core using the fuel assemblies 10 of the present embodiment, the ratio of surface area of absorbing rod/surface area of fuel rod is set at about 0.20 by increasing the control rod worth with inserting control rods 6 at every sides of all square cross sections. Accordingly, the reactor shut down margin could be ensured.

Referring to FIG. 7, change in reactor shut down margin depending on variation of the ratio of transversal cross section area of absorbing rod/transversal cross section area of water gap region was calculated using the reactor shut down margin obtained by the prior art as a standard under a condition that the H/U ratio was fixed at 5 on two cases, the one was on the case in which the distance (X) between the adjacent fuel assemblies was 15 cm (the same as the prior art), and the other was on the case in which the distance between the adjacent fuel assemblies was 23 cm (increasing size). The result shown in FIG. 7 indicates almost the same characteristics as the result shown in FIG. 6, and it is revealed that an equivalent reactor shut down margin to that of the prior art (using the reactor core composed of the fuel assemblies having an X nearly equals to 15 cm, and the ratio of transversal cross section area of absorbing rod/transversal cross section area of water gap region nearly equals to 0.25) can be ensured with the fuel assemblies of increased size having an X equals to 23 cm by making the ratio of transversal cross section area of absorbing rod/transversal cross section area of water gap region a value at least 0.4.

In the reactor core using the fuel assemblies 10 of the present embodiment, the ratio of transversal cross section area of absorbing rod/transversal cross section area of water gap region is set at 0.4 by increasing the control rod worth with inserting control rods 6 at every sides of all square cross sections, and accordingly, the reactor shut down margin can be ensured.

As explained above, in accordance with the fuel assembly 10 of the present embodiment, the thermal margin can be ensured by making the ratio of transversal cross section area of water rod/transversal cross section area of fuel pellet about 0.6 with increasing the transversal cross section area of the water rod 4 and decreasing the transversal cross section of the water gap region 60, and the reactor shut down margin can be ensured by decreasing the excess reactivity with making the transversal cross section area of the water rods 4 about 15 $cm^2$. Consequently, as the number of the fuel assemblies can be reduced by increasing size of the fuel assembly, a labor-saving fuel exchange operation can be realized.

In accordance with the reactor core using the fuel assemblies 10 of the present embodiment, the local power peaking factor can be decreased and thermal margin can be ensured by decreasing the transversal cross section area of the water gap region 60 and making the ratio of transversal cross section area of water gap region/transversal cross section area of fuel pellet about 0.5. And, consequently, an advantage of increasing the above reactor shut down margin by composing with the fuel assemblies 10 can be achieved.

Further, in accordance with the reactor core using the fuel assemblies 10 of the present embodiment, the reactor shut down margin can be ensured by making the ratio of surface area of absorbing rod/surface area of fuel rod about 0.2 with increasing the control rod worth by inserting the control rod 6 at every sides of the square transversal cross section, and making the ratio of transversal cross section area of absorbing rod/transversal cross section area of water gap region about 0.4. And, consequently, a labor-saving fuel exchange operation can be realized because of reducing the number of the fuel assemblies in the reactor core.

Besides, with the fuel assembly 10 of the above first embodiment of the present invention, the water rod 4 may be replaced with a rod of zirconium hydride. A solid moderating rod such as the zirconium hydride has almost the same capacity to moderate neutrons as the water rod, and consequently, the reactor shut down margin can be ensured as same as the above embodiment. The same effect can be realized for the reactor core loaded with the fuel assemblies of the present embodiment.

Embodiment 2

The second embodiment of the present invention is explained hereinafter referring to FIGS. 8-12.

Figure 8:
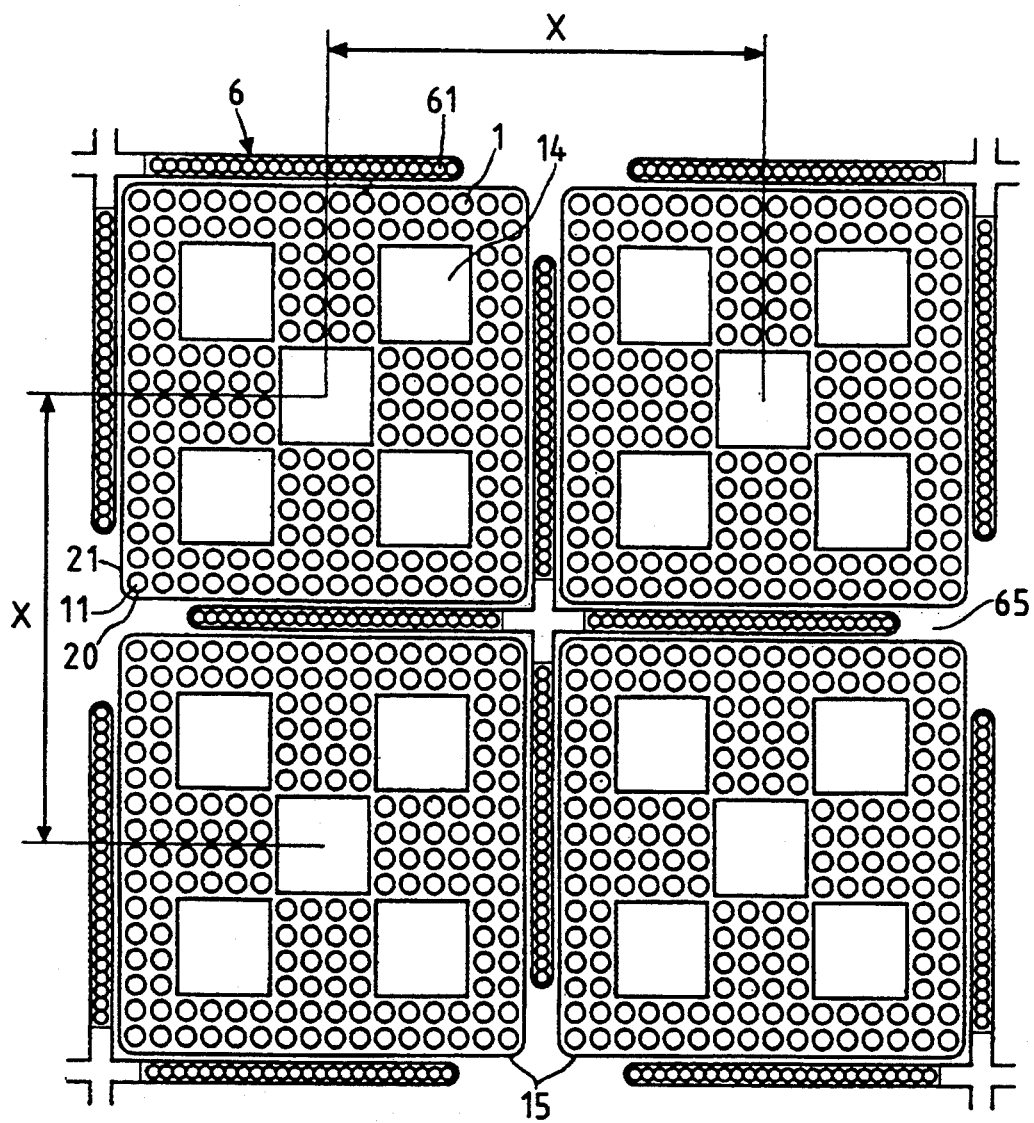
FIG. 8 is a horizontal cross section of a fuel assembly relating to the second embodiment of the present invention.

A transversal cross section of the fuel assemblies relating to the present embodiment is shown in FIG. 8. FIG. 8 indicates horizontal cross sections of adjacent four fuel assemblies composing a part of a reactor core. Same members as the members of the first embodiment are indicated with same numerals as the numerals in the first embodiment.

Different points from the first embodiment are that a shape of cross section of the water rod 14 alters to a square, cross section area of the water rod increases slightly (cross section area is about 20 cm$^2$), accordingly the number of the fuel rods decreases by 16 to be 176, and the ratio of H/U becomes about 6.

With the fuel assembly 15 of the present embodiment, the ratio of transversal cross section area of water rod/transversal cross section area of fuel pellet is approximately 1.0, the transversal cross section area per water rod is about 20 cm$^2$, and a ratio of sum of cross section area for moderator (boiling water and non-boiling water) in the channel box 21 to sum of cross section area of the fuel pellets 11 (hereinafter called water to fuel volumetric ratio averaged in the fuel assembly) equals to nearly 2.7. Further, with the reactor core, a ratio of transversal cross section area of water gap region/transversal cross section area of fuel pellet equals to approximately 0.6, a ratio of sum of cross section areas for moderator (boiling water and non-boiling water) in the reactor core to sum of cross section areas of the fuel pellets 11 (hereinafter called water to fuel volumetric ratio averaged in the reactor core) equals to approximately 3.3.

In the present embodiment, regarding to reducing a local power peaking factor of the fuel assembly in view of increasing thermal margin, a relationship between the local power leaking coefficient in a diametral direction and transversal cross section area of water rod/transversal cross section area of fuel pellet was investigated as well as FIG. 3 in the first embodiment, and a result shown in FIG. 9 was obtained as same as the fuel assembly 10 explained referring to FIG. 3.

In FIG. 9, a different point from FIG. 2 in the first embodiment is only the point that the H/U ratio is 6, and others are almost same qualitatively. That means the decreasing rate of the local power peaking factor has a deflecting point at around a value of 0.4 for the ratio of transversal cross section area of water rod/transversal cross section area of fuel pellet, and closes to saturation in a range exceeding the value of 0.4. Therefore, it was revealed that, in order to keep the local power peaking factor low when the size of the fuel assembly increases, it is effective to make the ratio of transversal cross section area of water rod/transversal cross section area of fuel pellet at least 0.4. That is, the same conclusion with the first embodiment in which the H/U ratio was about 5 was obtained.

The fuel assembly 15 of the present embodiment has a value of about 1.0 for the ratio of transversal cross section area of water rod/transversal cross section area of fuel pellet. Accordingly, it is possible to decrease the local power peaking factor, and to increase the thermal margin.

Further, the transversal cross section area per water rod in the fuel assembly 15 of the present embodiment is 20 cm$^2$. It lies in a range of 14–50 cm$^2$ which is the condition for reducing excess reactivity in increasing size of the fuel assembly as shown in FIG. 4 as same as the fuel assembly 10 in the first embodiment, and accordingly, the fuel assembly of the present embodiment can reduce the excess reactivity and increase the reactor shut down margin.

Besides, the inventor reveals that the reactor shut down margin can be increased by optimizing the water to fuel volumetric ratio averaged in a fuel assembly in addition to the effect of increasing the reactor shut down margin by optimizing the transversal cross section area per water rod with the fuel assembly 15 of the present embodiment. The effect is explained hereinafter referring to FIGS. 10(a) and 10(b).

Figure 10A:
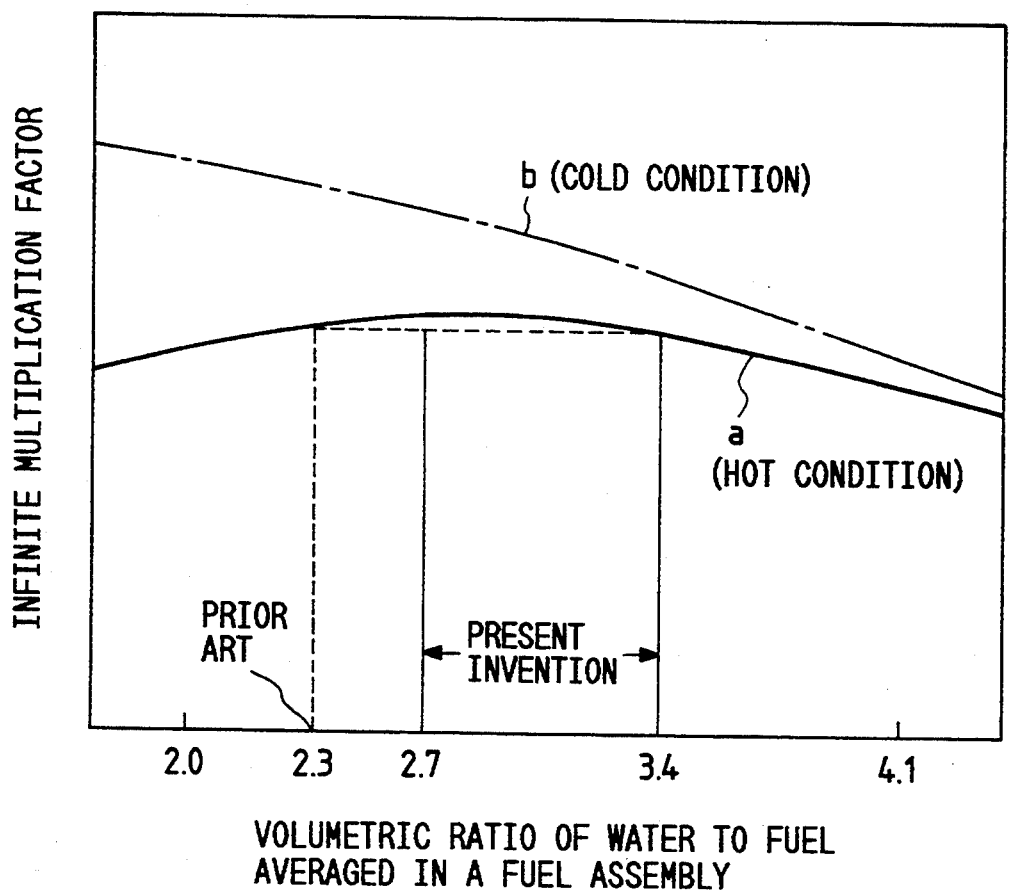
FIGS. 10(a) and 10(b) are graphs showing relationship of an infinite multiplication factor and a reactivity difference between operation condition and cold condition corresponding to change of averaged volumetric ratio of water to fuel in a fuel assembly respectively.
Figure 10B:
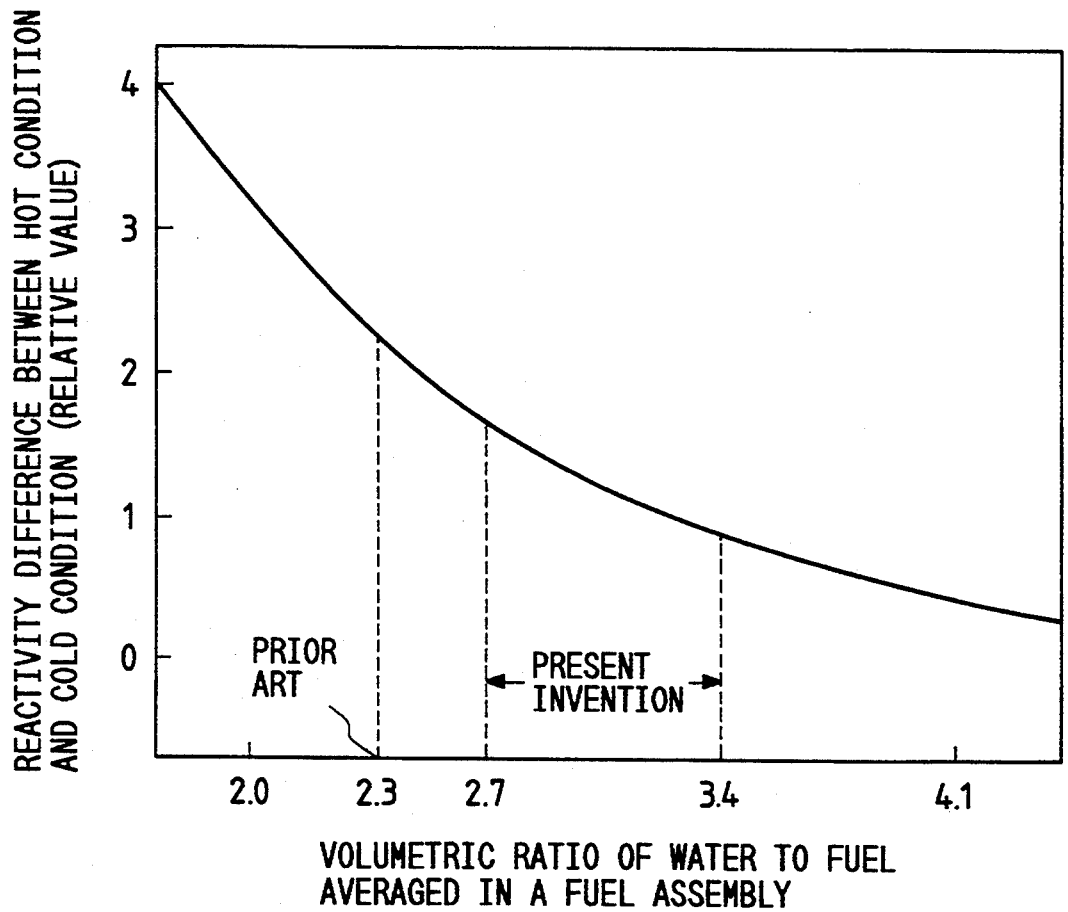

FIGS. 10(a) and 10(b) indicate results of calculation which obtain change of infinite multiplication factors in a cold condition and a hot condition and change in reactivity difference between the hot condition and the cold condition with variation of water to fuel volumetric ratio averaged in the fuel assembly under a condition that a fraction of boiling water(boiling water among fuel rods 1 and water rods 14 in the channel box of the fuel assembly 15) is constant (a ratio of transversal cross section area of boiling water region/transversal cross section area of fuel pellet is about 1.7, and an average void fraction is 40% as same as the prior art). Referring to FIGS. 10(a) and 10(b), when water to fuel volumetric ratio in a fuel assembly increases from the value for the conventional fuel assembly (about 2.3), the infinite multiplication factor gradually increases by increasing a moderating effect of water to neutron in the hot condition. But further increase of the water to fuel volumetric ratio makes an absorbing effect for neutrons by water larger than the moderating effect of water, and the infinite multiplication factor begins to decrease gradually. However, in the cold condition, the density of water is larger than that in the hot condition and the absorbing effect for neutrons always larger than the moderating effect in a range shown in FIGS. 10(a) and 10(b). Accordingly, the infinite multiplication factor always decreases in accordance with increase of the water volumetric ratio.

As shown in FIGS. 10(a) and 10(b), if the water to fuel volumetric ratio averaged in a fuel assembly is at least 2.7, the reactivity difference in both a hot condition and a cold condition can be reduced more than that of the prior art, and it is effective for increasing reactor shut down margin. However, the infinite multiplication factor in a hot condition becomes lower than that of the conventional one when the water to furl volumetric ratio at about 3.4. Therefore, it was revealed that making the water to fuel volumetric ratio averaged in a fuel assembly a value between 2.7 and 3.4 is effective for increasing the reactor shut down margin when increasing the size of the fuel assembly.

The fuel assembly 15 in the present embodiment has a water to fuel volumetric ratio of 2.7 and satisfies the above condition. Accordingly, the reactivity in a cold condition can be reduced without decreasing the reactivity in a hot condition so much, the excess reactivity can be reduced, and the reactor shut down margin can be increased.

When defining the above condition in a condition shown in FIG. 8 which is a fuel assembly without the channel box, a value as for the water to fuel volumetric ratio averaged in a fuel assembly must be calculated as a ratio of sum of transversal cross section areas of regions occupied with moderator (boiling water and non-boiling water) in a region surrounded with planes which are imaginary formed downwards vertically from outer edges of the upper tie plate 81 (refer to FIG. 2) which bundles the upper ends of the fuel rods 1 to sum of transversal cross section areas of fuel pellets 11.

Figure 11:
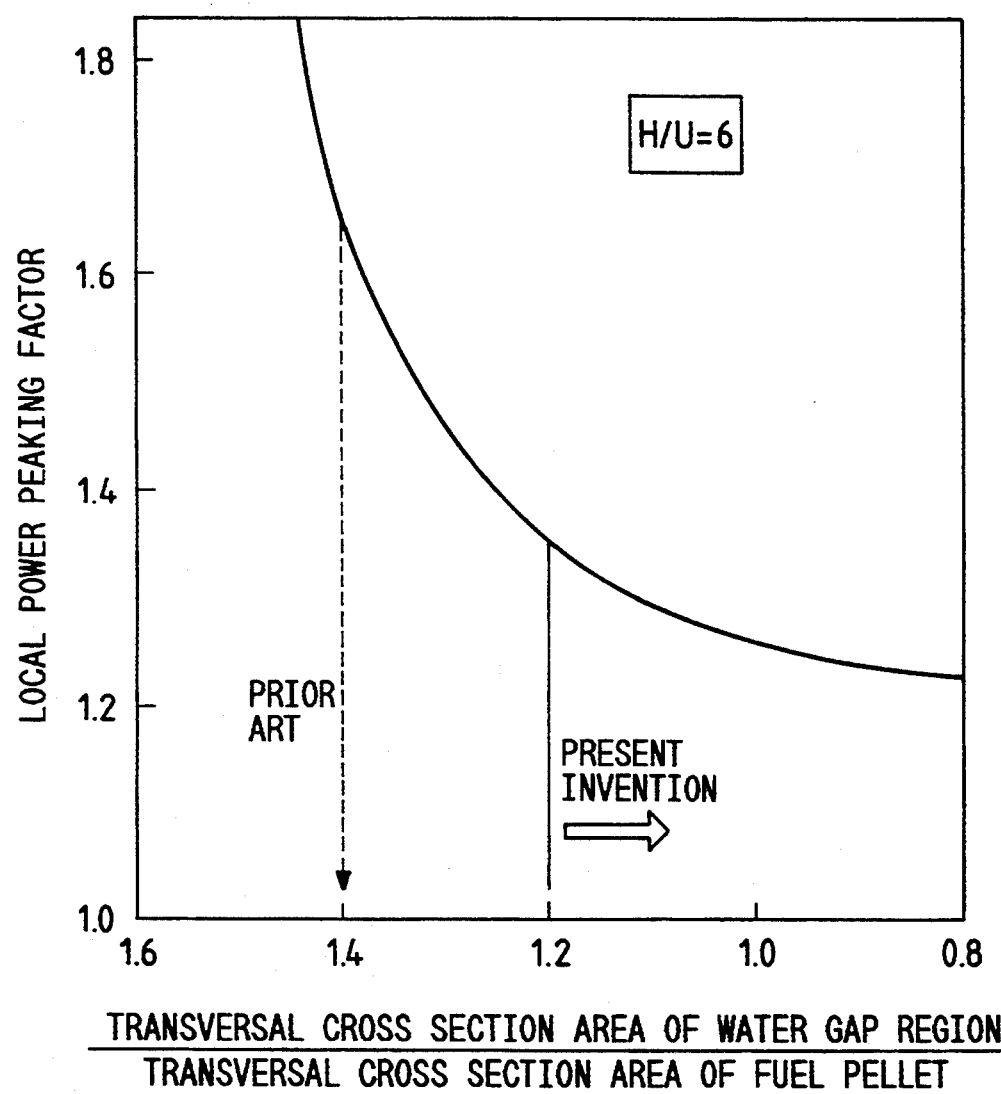
FIG. 11 is a graph showing a relationship in change of a local power peaking factor corresponding to change of a ratio of a transversal cross section area of water gap regions to transversal cross section area of fuel pellets.

Next, in the reactor core using the fuel assemblies 15 of the present embodiment, the inventors investigated a relationship between the local power peaking factor in a diametral direction of the core and a ratio of transversal cross section area of water gap region/transversal cross section area of fuel pellet in view of reducing the local power peaking factor in the core for improving thermal margin, and obtained the result shown in FIG. 11.

The result was obtained by converting the result shown in FIG. 9, that is the relationship between the ratio of transversal cross section area of water rod/transversal cross section area of fuel pellet and the local power peaking factor in a diametral direction, to the relationship between the ratio of transversal cross section area of water gap region/transversal cross section area of fuel pellet and the local power peaking factor in a diametral direction in consideration that the H/U ratio was constant, about 6. The qualitative trend indicated in FIG. 11 is almost similar with that observed in FIG. 9 except the abscissa indicates the ratio of transversal cross section area of water gap region/transversal cross section area of fuel pellet in the reactor core instead of the ratio of transversal cross section area of water rod/transversal cross section area of fuel pellet and consequent change of absolute value in the abscissa. That means, the decreasing rate of the local power peaking factor closes to saturation in a region having at least 1.2 for the ratio of transversal cross section area of water gap region/transversal cross section area of fuel pellet. Consequently, it was concluded that, in order to decrease the local power peaking factor with increasing size of the fuel assembly, it is effective to select at least 1.2 for a value of the ratio of transversal cross section area of water gap region/transversal cross section area of fuel pellet.

The reactor core using the fuel assemblies 15 of the present embodiment has a value of 0.6 for the ratio of transversal cross section area of water gap region/transversal cross section area of fuel pellet by increasing the transversal cross section area of the water rods 4 and decreasing the transversal cross section area of the water gap region 60. Consequently, the reactor core of the present embodiment can reduce the local power peaking factor and increase the thermal margin.

Figure 12A:
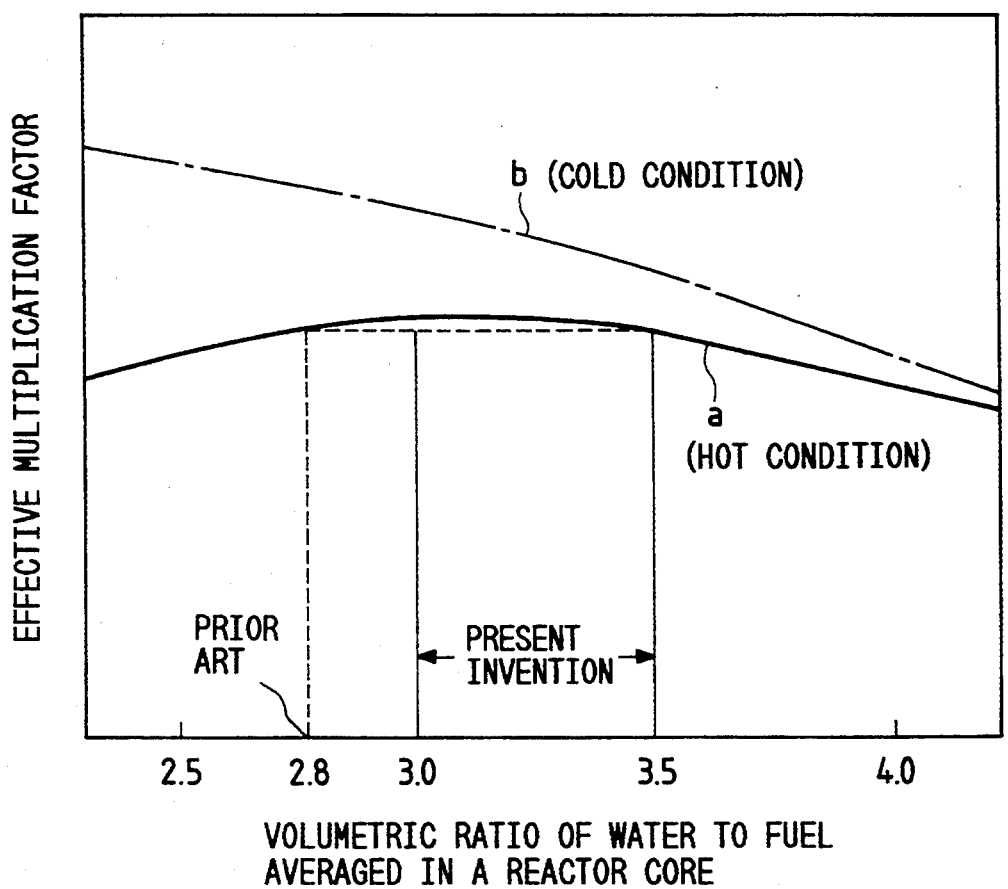
FIGS. 12(a) and 12(b) are graphs showing relationship of an infinite multiplication factor and a reactivity difference between operation condition and cold condition corresponding to change of averaged volumetric ratio of water to fuel in a reactor core respectively.
Figure 12B:
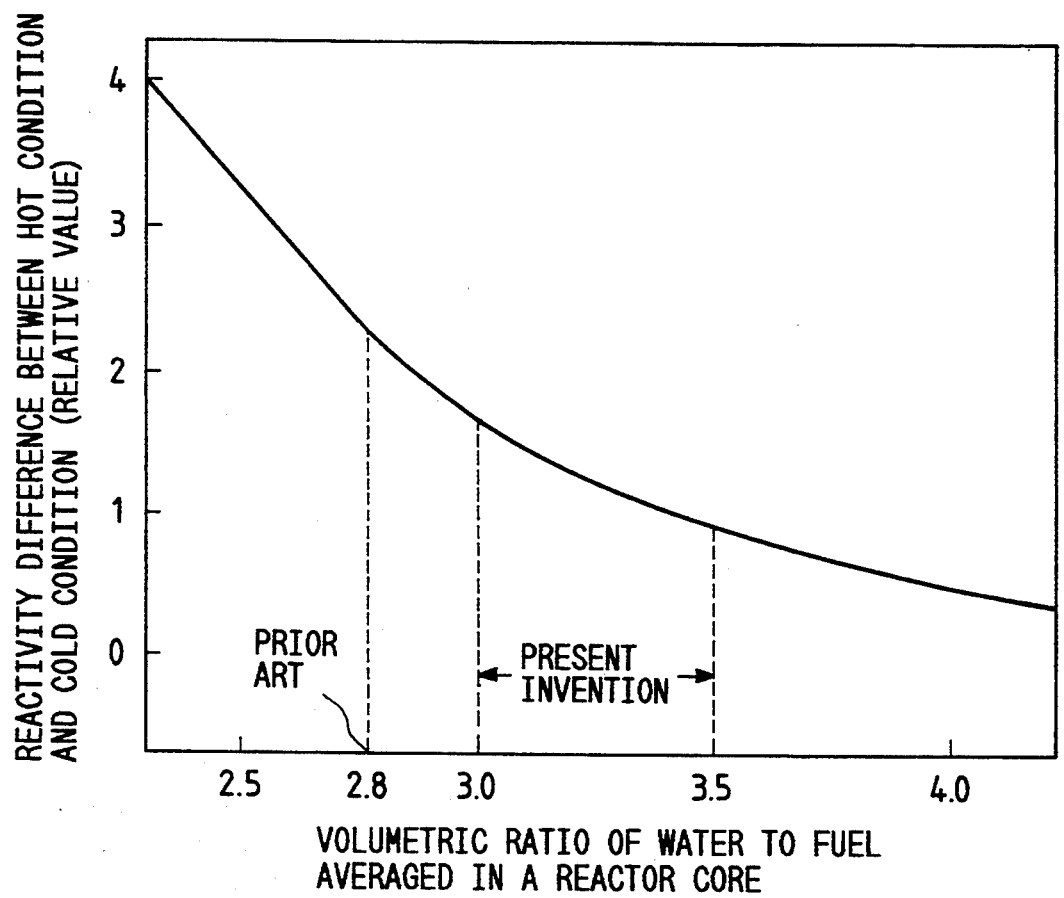

Besides, in the reactor core using the fuel assemblies 15 of the present embodiment, the inventors investigated a relationship between the effective multiplication factor, reactivity difference between a hot condition and a cold condition, and water to fuel volumetric ratio averaged in the reactor core in view of reducing the excess reactivity (reactivity difference between a hot condition and a cold condition) in the reactor core for increasing the reactor shut down margin, and obtained the result shown in FIG. 12.

The result was obtained by converting the result shown in FIGS. 10($a$) and 10($b$), that is the relationship between the effective multiplication factor, the reactivity difference between the hot condition and the cold condition, and the water to fuel volumetric ratio averaged in the fuel assembly is converted to the relationship between the effective multiplication factor, the reactivity difference between the hot condition and the cold condition, and the water to fuel volumetric ratio averaged in the reactor core, The qualitative trend indicated in FIG. 12 is almost similar with that observed in FIG. 10 except the abscissa indicates the water to fuel volumetric ratio averaged in the reactor core (a value for the conventional reactor core is about 2.8) and the effective multiplication factor is not for expressing the reactivity of the fuel assembly but for expressing the reactivity of the reactor core.

That means, if the water to fuel volumetric ratio is at least 3.0, the reactivity difference between the hot condition and the cold condition can be reduced more than that of the conventional one and it is effective in increasing the reactor shut down margin, but the infinite multiplication factor in the hot condition becomes lower than that of the conventional one at a point where the water to fuel volumetric ratio is about 3.5. Consequently, it was concluded that, in order to increase the reactor shut down margin with increasing size of the fuel assembly, it is effective to make the water to fuel volumetric ratio be in a range 3.0–3.5.

The reactor core using the fuel assemblies 15 of the present embodiment has a value of about 3.3 for the water to fuel volumetric ratio. Consequently, the reactor core of the present embodiment satisfies the above preferable condition, soften neutron spectrum of the reactor core (reducing average energy of the neutrons) for reducing the reactivity difference between the hot condition and the cold condition to decrease excess reactivity, and can increase the reactor shut down margin.

Accordingly, with the fuel assembly 10 of the present embodiment, the thermal margin can be ensured by making the ratio of transversal cross section area of water rod/transversal cross section area of fuel pellet about 1.0 with increasing the transversal cross section area of the water rods 14 and decreasing the transversal cross section area of the water gap region 65, and the reactor shut down margin can be ensured by decreasing the excess reactivity with making the transversal cross section area of the water rods 14 about 20 cm$^2$.

Further, in accordance with the fuel assembly 15 of the present embodiment, the excess reactivity is reduced by making the water to fuel volumetric ratio averaged in the fuel assembly about 2.7, and therefore, the reactor shut down margin can be ensured.

Consequently, as the number of the fuel assemblies can be reduced by increasing size of the fuel assembly, a labor-saving fuel exchange operation can be realized.

In accordance with the reactor core using the fuel assemblies 15 of the present embodiment, the local power peaking factor can be decreased and thermal margin can be ensured by decreasing the transversal cross section area of the water gap region 65 and making the ratio of transversal cross section area of water gap region/transversal cross section area of fuel pellet about 0.6. And, consequently, an advantage of ensuring the above reactor shut down margin by making the transversal cross section area per water rod in the fuel assemblies 15 about 20 cm² can be realized.

Further, in accordance with the reactor core using the fuel assemblies 15 of the present embodiment, the reactor shut down margin can be ensured by decreasing the reactivity difference between the hot condition and the cold condition and reducing the excess reactivity with making the water to fuel volumetric ratio about 3.3 in addition to the previously described effect for ensuring the reactor shut down margin.

And, consequently, a labor-saving fuel exchange operation can be realized because of reducing the number of the fuel assemblies in the reactor core.

Embodiment 3

The third embodiment of the present invention is explained hereinafter referring to FIG. 13.

Figure 13:
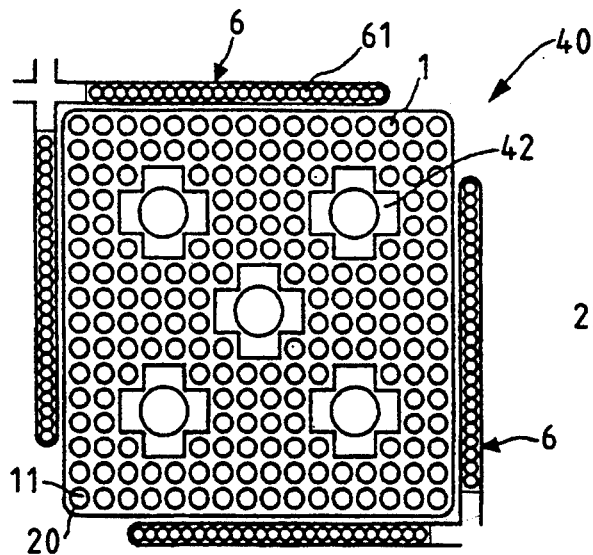
FIG. 13 is a horizontal cross section of a fuel assembly relating to the third embodiment of the present invention.

FIG. 13 indicates a transversal cross section of the fuel assembly 40 of the present embodiment. Common members with the members in the first embodiment are expressed by the same numerals. The fuel assembly 40 of the present embodiment differs from the fuel assembly 10 in the first embodiment shown in FIG. 1 in a point that the water rod 4 is replaced with a double wall water rod 42 in which water level in the rod ascends to a high position when the flow rate of the moderator. is large and descends to a low position when the flow rate is small. Others are almost similar with the first embodiment. The double wall water rod 42 is disclosed in detail in JP-A-63-73187 (1988).

In accordance with the fuel assembly 40 composed as of the above explanation, an effect of spectrum shift by controlling moderator flow rate can be amplified in addition to effects of ensuring the thermal margin and the reactor shut down margin obtained by the fuel assembly 10 in the first embodiment, and consequently, it becomes possible to reduce necessary uranium enrichment and to operate the reactor without inserting control rods.

Further, in an embodiment on a reactor core which is loaded with the above fuel assemblies 40, same effect as the fuel assembly 40 can be obtained on the reduction of uranium enrichment and the operation of the reactor without inserting control rods.

Embodiment 4

Figure 14:
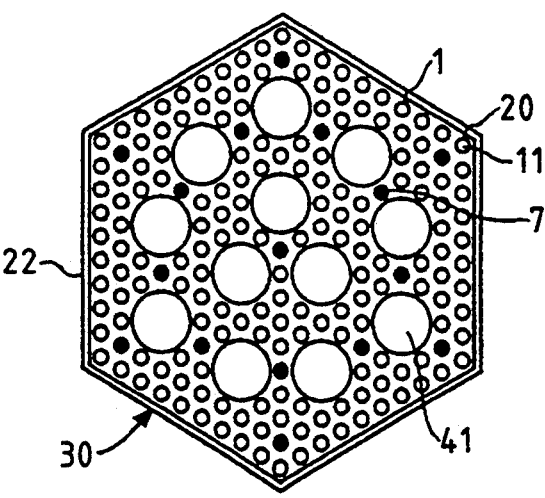
FIG. 14 is a horizontal cross section of a fuel assembly relating to the fourth embodiment of the present invention.

The fourth embodiment of the present invention is explained hereinafter referring to FIGS. 14 and 15.

The present embodiment is a case in which the present invention is applied to a fuel assembly having a hexagonal transversal cross section. The transversal cross section of the fuel assembly relating to the present embodiment is shown in FIG. 14. Common members with members in the first and second embodiments are indicated with the same numerals.

The fuel assembly 30 of the present embodiment has a side of the hexagonal cross section of about 12 cm, a distance between centers of adjacent two fuel assemblies (Y) of about 22 cm when they are loaded in a reactor core (details are described later), and is increased in size comparing with the conventional fuel assembly. Further, the fuel assembly 30 is composed of cluster type control rods 7 inserted into the channel box 22, water gap regions among fuel assemblies when composing the reactor core become narrower than that of the first embodiment, and accordingly, the ratio of transversal cross section area of water rod/transversal cross section area of fuel pellet becomes larger as about 1.0 than that of the first embodiment. The transversal cross section area per water rod is about 15 cm².

Regarding to the fuel assembly 30 of the present embodiment composed as of the above explanation, the inventors obtained a finding that the relationship between the ratio of transversal cross section area of water rod/transversal cross section area of fuel pellet and the local power peaking factor in a diametral direction, which was explained in the previous first embodiment referring to FIG. 3, is correct notwithstanding shapes of cross section and arrangements of fuel rods in the fuel assembly and is applicable to the fuel assembly 30 of the present embodiment. The fuel assembly 30 of the present embodiment has a value of 1.0 for the ratio of transversal cross section area of water rod/transversal cross section area of fuel pellet. Accordingly, the local power peaking factor can be decreased and the thermal margin can be increased with the fuel assembly 30 of the present embodiment.

Figure 4A:
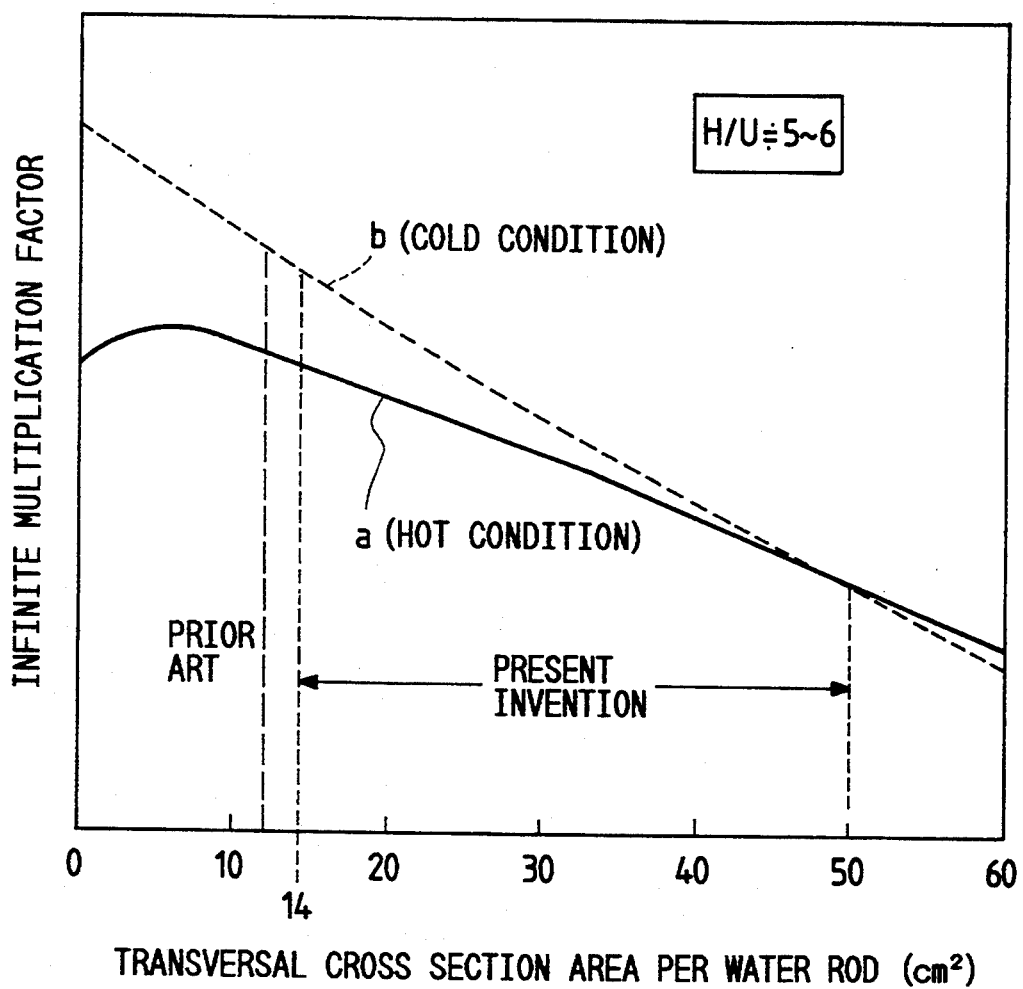
FIGS. 4(a) and 4(b) are graphs showing relationship of an infinite multiplication factor and a reactivity difference between operation condition and cold condition corresponding to change of transversal cross section area per water rod respectively.
Figure 4B:
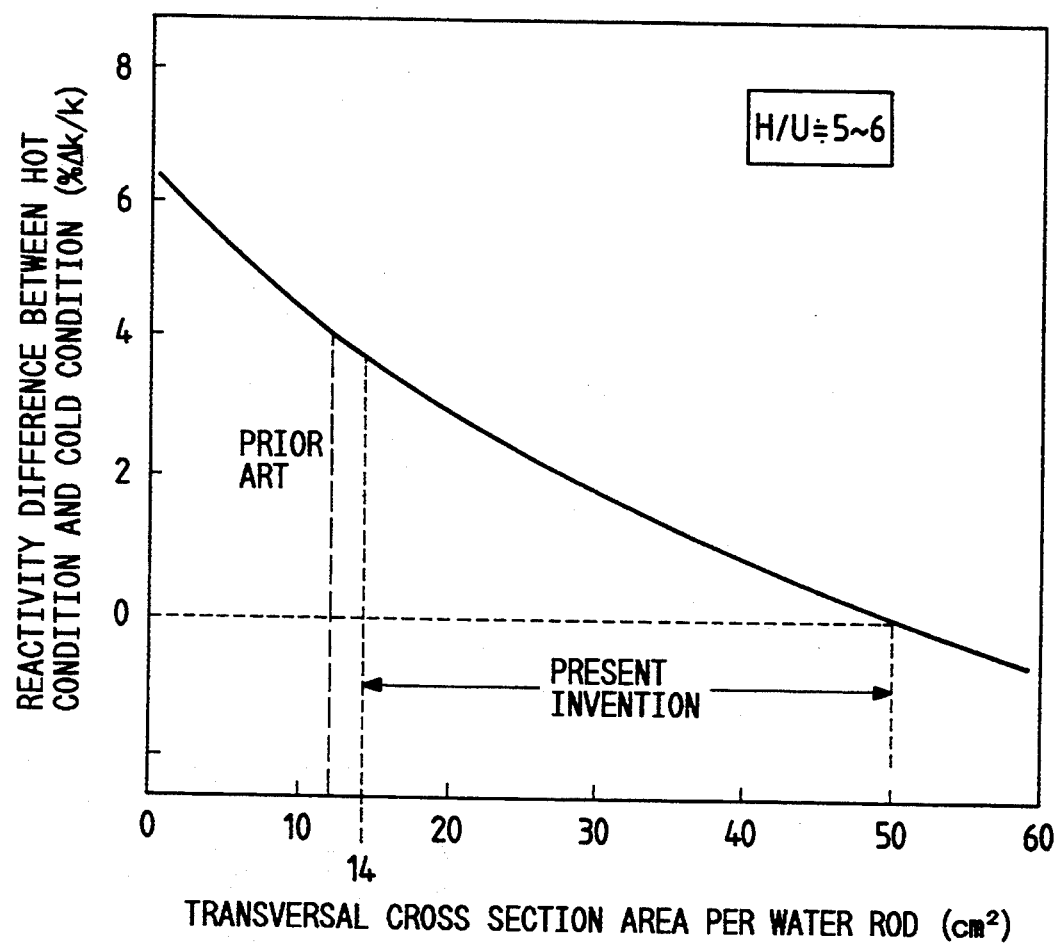

Further, the inventors obtained a finding that the relationship between the transversal cross section area per water rod, and the infinite multiplication factor and the reactivity difference between in a hot condition and in a cold condition, which was explained in the previous first embodiment referring to FIGS. 4(a) and 4(b), is correct notwithstanding shapes of cross section and arrangements of fuel rods in the fuel assembly and is applicable to the fuel assembly 30 of the present embodiment. The fuel assembly 30 of the present embodiment has a value of about 15 cm² for the transversal cross section area per water rod, and accordingly, the excess reactivity can be decreased and the reactor shut down margin can be increased with the fuel assembly 30 of the present embodiment.

Figure 15:
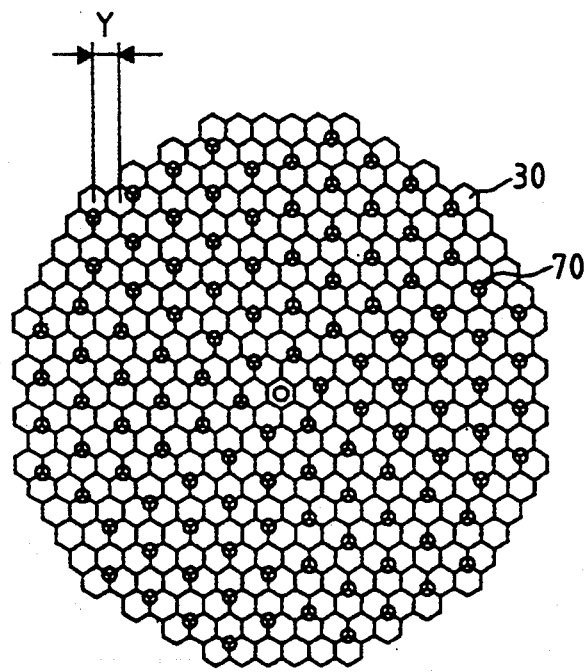
FIG. 15 is a horizontal cross section of a reactor core relating to the fourth embodiment of the present invention.

A reactor core using the fuel assemblies 30 of the present embodiment is shown in FIG. 15. The reactor core is composed of the fuel assemblies 30 each of which are arranged in a honeycomb structure so that each side of the fuel assembly 30 contacts with one of the fuel assemblies 30 respectively, that means six other fuel assemblies 30 per fuel assembly 30. With the above described reactor core using the fuel assemblies 30 of the present embodiment, the effects accompanied with the above fuel assembly 30 such as increasing thermal margin and increasing reactor shut down margin with reducing the excess reactivity are realized.

Therefore, in accordance with the fuel assembly 30 of the present embodiment, the thermal margin can be ensured by inserting the cluster type control rods into the channel box 22 so as to make the ratio of transversal cross section area of water rod/transversal cross section area of fuel pellet about 1.0, and the reactor shut down margin can be ensured by selecting the transversal cross section area of the water rod 41 as 15 cm² so as to reduce the excess reactivity. Accordingly, increasing size of the fuel assembly and reducing the number of the fuel assemblies are realized, and the labor-saving fuel exchange operation becomes possible.

Further, in accordance with the reactor core using the fuel assemblies 30 of the present embodiment, same effects as the above effects can be realized.

Although the fuel assembly having a hexagonal transversal cross section was explained in the above fourth embodiment, the present invention can be applied to the fuel assemblies having other shapes such as triangle, rhombus, circle, etc. and same effects can be obtained.

In the above embodiments from the first to the fourth, enriched uranium oxide as for the fuel, zircaloy as for the reactor core structures, and water as for the moderator and the coolant are used. However, the present invention can be applied to other cases in which other kinds of fuel, structures, moderator, and coolant are used, and same effects as that of the above embodiments can be realized.

The above described effects of the present invention can be summarized as follows;

The thermal margin can be ensured by making a ratio of a transversal cross section area of a moderating rod where is filled with moderator/fuel pellet transversal cross section area averaged in an axial direction at least 0.4. Accordingly, increasing size of the fuel assembly, reducing the number of the fuel assemblies, and labor-saving fuel exchange operation can be realized.

Further, the reactor shut down margin can be ensured by making the transversal cross section area of the moderator per moderating rod a value in a range of 14–50 cm$^2$ so as to reduce the excess reactivity. Accordingly, increasing size of the fuel assembly, reducing the number of the fuel assemblies, and labor-saving fuel exchange operation can be realized. Moreover, the reactor shut down margin can be ensured by making the ratio of sum of transversal cross section area of moderator in a region surrounded with imaginary planes which are extended downwards from outer edges of the upper tie plate/sum of transversal cross section areas of fuel pellets a value in a range 2.7–3.4 so as to decrease the excess reactivity. Further, because of replacing at least one of the moderating rods with a double wall water rod, the effect of spectrum shift by controlling the flow rate of the moderator is amplified to reduce necessary enrichment of uranium fuel, and it makes possible to operate the reactor without inserting the control rods.

Further, the thermal margin can be ensured by making the ratio of sum of transversal cross section areas of the moderator filled in the water gap region around the fuel assembly/sum of transversal cross section areas of fuel pellets a value utmost 0.7 so as to reduce the local power peaking factor. Accordingly, reducing the number of the fuel assemblies and labor-saving fuel exchange operation can be realized.

Moreover, the reactor shut down margin can be ensured by making the ratio of sum of surface areas of absorbing rods/sum of surface areas of fuel rods a value at least 0.20 so as to increase control rod worth. And, the reactor shut down margin can be ensured by making the ratio of sum of transversal cross section areas of absorbing rods/sum of transversal cross section areas of water gap region a value at least 0.40 so as to increase control rod worth. Furthermore, the reactor shut down margin can be ensured by making the ratio of sum of transversal cross section areas of moderator/sum of transversal cross section areas of the fuel pellets a value in a range 3.0–3.5 so as to decrease the excess reactivity.

What is claimed is:

1. A fuel assembly comprising
   a plurality of fuel rods which are composed of cladding tubes wherein a plurality of fuel pellets including fissile material are inserted, and
   at least a moderating rod which is filled with moderator for moderating neutrons generated by nuclear fissions,
   characterized in that
   a ratio of a sum of transversal cross section area of portions of said moderating rods which are filled with moderator to a sum of transversal cross section area of said fuel pellets averaged in an axial direction of the fuel assembly is at least 0.4.

2. A fuel assembly claimed in claim 1, wherein
   the transversal cross section area of portions filled with moderator per moderating rod is in a range of 14–50 cm$^2$.

3. A fuel assembly claimed in claim 1, wherein
   a ratio of a sum of transversal cross section area of said moderator in a transversal cross section surrounded with imaginary planes which are extended downwards from outer edges of an upper tie plate which bundles said plurality of fuel rods to a sum of transversal cross section area of said fuel pellets is a value. in a range 2.7–3.4.

4. A fuel assembly claimed in claim 1, wherein
   at least one of said moderating rods is a double wall water rod wherein water level moves up or down depending on a flow rate of the moderator.

5. A reactor core comprising any one of the fuel assemblies claimed in any of claims from claim 1 to claim 4.

6. A reactor core claimed in claim 5, wherein
   a ratio of a sum of transversal cross section area of said moderator filled in a water gap region around said fuel assemblies to the sum of transversal cross section area of said fuel pellets is utmost 0.7.

7. A reactor core claimed in claim 5, comprising
   a control rod which is composed of a plurality of absorbing rods including neutron absorber bundled in a form having a cruciform cross section, and is inserted into a water gap region around said fuel assemblies, wherein
   a ratio of a sum of surface area of said absorbing rods to a sum of surface area of said fuel rods is at least 0.2.

8. A reactor core claimed in claim 5, comprising
   a control rod which is composed of a plurality of absorbing rods including neutron absorber bundled in a form having a cruciform cross section, and is inserted into a water gap region around said fuel assemblies, wherein
   a ratio of a sum of transversal cross section area of said absorbing rods to a sum of transversal cross section area of said water gap region is at least 0.4.

9. A reactor core claimed in claim 5, wherein
   a ratio of a sum of transversal cross section area of said moderator to the sum of transversal cross section area of said fuel pellets is a value in a range 3.0–3.5.

* * * * *